United States Patent
Park et al.

(10) Patent No.: US 11,099,112 B2
(45) Date of Patent: Aug. 24, 2021

(54) DUST MEASUREMENT DEVICE AND METHOD

(71) Applicant: LG ELECTRONICS INC., Seoul (KR)

(72) Inventors: Chulwoo Park, Seoul (KR); Bongjo Sung, Seoul (KR)

(73) Assignee: LG El.FCTRONICS INC., Seoul (KR)

( * ) Notice: Subject to any disclaimer, the term of this patent is extended or adjusted under 35 U.S.C. 154(b) by 71 days.

(21) Appl. No.: 16/605,912

(22) PCT Filed: Mar. 9, 2018

(86) PCT No.: PCT/KR2018/002860
§ 371 (c)(1),
(2) Date: Oct. 17, 2019

(87) PCT Pub. No.: WO2018/194266
PCT Pub. Date: Oct. 25, 2018

(65) Prior Publication Data
US 2021/0102880 A1 Apr. 8, 2021

(30) Foreign Application Priority Data

Apr. 20, 2017 (KR) ........................ 10-2017-0051040

(51) Int. Cl.
*G01N 15/02* (2006.01)
*G01N 15/06* (2006.01)
*G01N 15/00* (2006.01)

(52) U.S. Cl.
CPC ..... *G01N 15/0205* (2013.01); *G01N 15/0656* (2013.01); *G01N 2015/0038* (2013.01); *G01N 2015/0283* (2013.01); *G01N 2015/0693* (2013.01)

(58) Field of Classification Search
CPC ...... G01N 1/2247; G01N 1/22; G01N 1/2252; G01N 27/04; G01N 2015/0046;
(Continued)

(56) References Cited

U.S. PATENT DOCUMENTS 4,966,462 A 10/1990 Novick
10,094,756 B2 * 10/2018 Matsuoka .......... G01N 15/0656
(Continued)

FOREIGN PATENT DOCUMENTS

EP 1924836 5/2008
JP 05-030759 4/1993
(Continued)

OTHER PUBLICATIONS

European Search Report dated Nov. 25, 2020 issued in Application No. 18787255.1.
(Continued)

*Primary Examiner* — Hoa Q Pham
(74) *Attorney, Agent, or Firm* — Ked & Associates, LLP (57) ABSTRACT

The present invention relates to a dust measurement device and method which can increase the accuracy of dust measurement by deriving a mass concentration on the basis of a number concentration distribution according to particle sizes. The dust measurement device of the present invention comprises: a charging unit for charging a feed material with electrical charges; a first dust collecting unit including a first and a second dust collecting electrode which are spaced apart from each other, through which the material passes, and to which different voltages are applied; a second dust collecting unit for collecting the material which has passed through the first dust collecting unit; a current measurement unit for measuring current flowing through the second dust collecting unit; and a control unit for calculating a mass concentration of the material by using the value of the
(Continued)

current measured by the current measurement unit and adjusting voltages applied to the charging unit and the first dust collecting unit on the basis of the mass concentration.

18 Claims, 7 Drawing Sheets

(58) Field of Classification Search
CPC ........... G01N 15/0266; G01N 15/0656; G01N 15/02; G01N 15/06; G01N 15/10; G01N 15/14; B01D 46/00; B03C 3/32; B03C 3/38; B03C 3/45; B03C 3/68; B03C 2201/24; B03C 2201/30; B02C 3/40; F01N 3/01
USPC ......... 356/335–343, 432–440; 96/16, 19, 67, 96/77, 96, 97; 73/28.02, 31.02
See application file for complete search history.

(56) References Cited

U.S. PATENT DOCUMENTS

| | | | | |
|---|---|---|---|---|
| 10,330,579 | B2 * | 6/2019 | Sugiyama | G01L 3/00 |
| 10,429,290 | B2 * | 10/2019 | Inoue | G01N 27/68 |
| 10,436,752 | B2 * | 10/2019 | Inoue | G01N 15/0656 |
| 2008/0041138 | A1 | 2/2008 | Marra | |
| 2008/0092742 | A1 | 4/2008 | Marra | |
| 2010/0043527 | A1 | 2/2010 | Marra | |
| 2010/0315638 | A1 * | 12/2010 | Goohs | G01N 21/274 356/337 |
| 2018/0238777 | A1 * | 8/2018 | Janka | G01N 15/0656 |
| 2019/0323940 | A1 * | 10/2019 | Tange | G01N 15/0656 |

FOREIGN PATENT DOCUMENTS

| | | |
|---|---|---|
| JP | 2008-544294 | 12/2008 |
| KR | 10-2003-0075704 | 9/2003 |
| KR | 10-0567788 | 4/2006 |
| KR | 10-0834036 | 5/2008 |
| KR | 10-1152337 | 6/2012 |
| KR | 10-1269275 | 5/2013 |
| KR | 10-1551289 | 9/2015 |
| KR | 10-1559765 | 10/2015 |
| KR | 10-2016-0001203 | 1/2016 |
| WO | WO 2007/000710 | 1/2007 |

OTHER PUBLICATIONS

International Search Report dated Apr. 8, 2019 issued in Application No. PCT/KR2018/002860.

* cited by examiner

FIG. 1

Prior Art

DUST MEASUREMENT DEVICE AND METHOD

CROSS-REFERENCE TO RELATED PATENT APPLICATIONS

This application is a U.S. National Stage Application under 35 U.S.C. § 371 of PCT Application No. PCT/KR2018/002860, filed Mar. 9, 2018, which claims priority to Korean Patent Application No. 10-2017-0051040, filed Apr. 20, 2017, whose entire disclosures are hereby incorporated by reference.

FIELD

The present disclosure relates to an apparatus and a method for measuring dust, and more particularly to, an apparatus and a method for measuring dust that may derive a mass concentration based on a number concentration distribution based on a particle size to increase an accuracy of dust measurement.

DESCRIPTION OF RELATED ART

The present disclosure relates to an apparatus and a method for measuring dust. In particular, the present disclosure may be used in a dust removal apparatus, which is applied to an air conditioner system, an air purifier, and the like to remove dust in air and discharge purified air.

Figure 1:
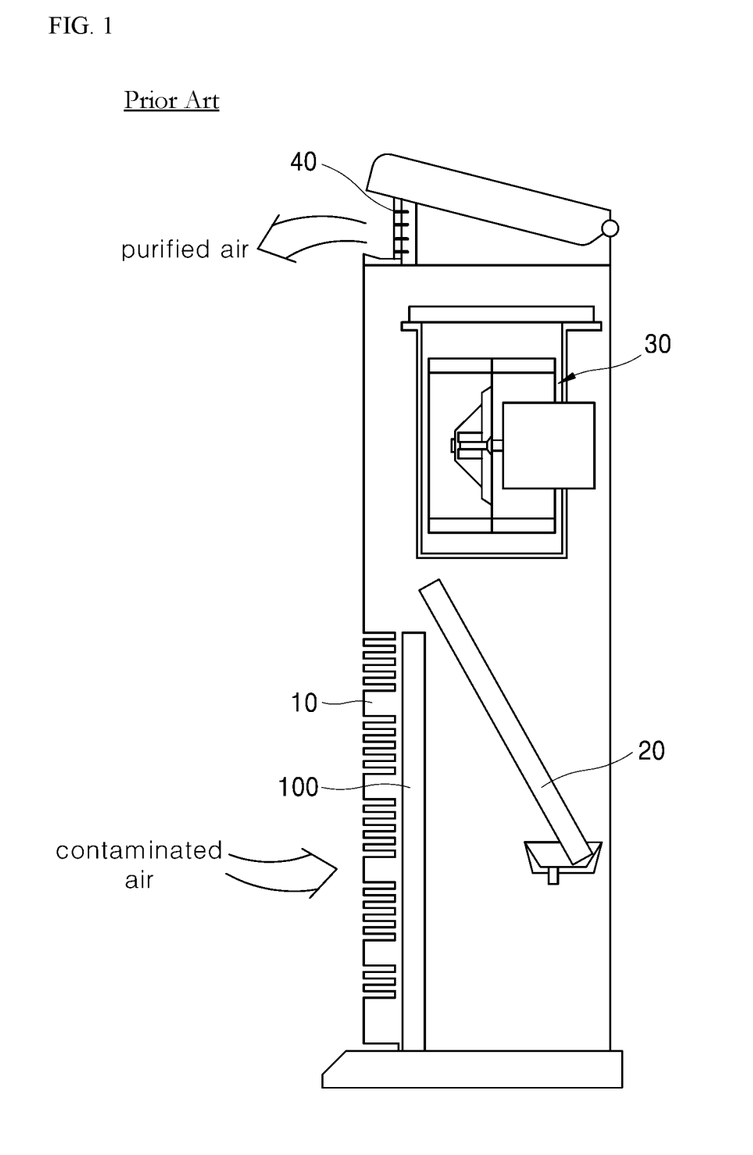
FIG. 1 is a view illustrating a dust removal apparatus according to an embodiment of the prior art.

FIG. 1 is a view illustrating a dust removal apparatus according to an embodiment of the prior art. Hereinafter, an air conditioner capable of purifying and cooling contaminated air will be described.

Referring to FIG. 1, a general air conditioner includes a suction grill 10 for sucking indoor contaminated air into the apparatus, a dust measuring apparatus 100 for removing contaminants contained in the air sucked by the suction grill 10, a heat exchanger 20 for lowering a temperature of the air by heat-exchanging the air purified by the dust measuring apparatus 100, a blower 30 for discharging the air having a temperature, which is lowered while the air passes through the heat exchanger 20, to outside of the system, and a discharge grill 40 for changing a direction of the air discharged to the outside by the blower 30.

The dust measuring apparatus 100 performs a function of removing the contaminants such as dust contained in the contaminated indoor air. In general, the dust measuring apparatus 100 may use an electric dust collection scheme in which a high voltage is discharged to charge the contaminants and then the dust is collected.

Conventionally, a PM sensor capable of measuring particulate matter (PM) was used to measure an amount of the dust in the air flowed into the dust removal apparatus. The PM sensor uses a heater to generate an ascending air current and scatters light emitted from LEDs on the dust moving along the ascending air current. Subsequently, the scattered light is detected by a photodiode, and when there is the dust, an output voltage value of the photodiode drops. That is, the PM sensor may measure a number concentration of the introduced air by converting a ratio of a low voltage per unit time into a concentration, based on the output voltage value of the photodiode.

However, when using the conventional optical measurement scheme, the overall number concentration is able to be measured, but a number concentration distribution based on a particle size is not able to be measured. Specifically, a current regulation on suspended dust uses a mass concentration of the dust. In order to calculate the mass concentration, the mass concentration must be inferred from the measured number concentration. However, an accuracy of the inferred mass concentration is very poor since the number concentration distribution based on the particle size is not be able to be measured. In addition, in the case of the optical measurement, it is difficult to measure dust of a size equal to or below 300 nm, which occupies most of the dust.

In the prior art, a plurality of impactors or a cascade Impactor was required to obtain the number concentration distribution based on the particle size. However, miniaturization of such a plurality of impactors or cascade impactor is difficult, and the accuracy of the measurement is low because the impactor is not able to separate dust of a desired particle size 100%. Further, when the impactor is not used, the number concentration based on the particle size is not able to be measured. Further, since current values for all particle sizes are measured, the accuracy is greatly reduced when particles larger or smaller than usual are introduced.

DISCLOSURE

Technical Purposes

A purpose of the present disclosure is to provide an apparatus and a method for measuring dust in which, since a number concentration distribution based on a particle size is measured, a conversion of the number concentration distribution into a mass concentration may be achieved, thereby increasing an accuracy of dust measurement.

Another purpose of the present disclosure is to provide an apparatus and a method for measuring dust that are advantageous for miniaturization and do not generate differential pressure during operation because a mass concentration may be calculated without using a separate particle size classification apparatus (e.g., an impactor).

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

Technical Solutions

One aspect of the present disclosure provides a dust measuring apparatus including: an electrifier for electrifying introduced dust; a first dust collector including first and second dust collecting electrodes arranged to be spaced apart from each other, wherein different voltages are respectively applied to the first and second dust collecting electrodes such that the first and second dust collecting electrodes collect the electrified dust; a second dust collector for collecting the dust passing through the first dust collector; a current measuring unit for measuring a current flowing in the second dust collector; and a controller that uses a current value measured in the current measuring unit to calculate a mass concentration of the dust and adjusts voltages respectively applied to the electrifier and to the first dust collector based on the mass concentration.

Another aspect of the present disclosure provides a method for measuring dust of a dust measuring apparatus including an electrifier for electrifying introduced dust, a first dust collector for collecting the electrified dust, and a second dust collector for collecting the dust passing through the first dust collector, the method including: measuring a first current flowing in the second dust collector when a first voltage is applied to the electrifier and a second voltage is not applied to the first dust collector; measuring a second current flowing in the second dust collector when the first voltage is applied to the electrifier and the second voltage is applied to the first dust collector; and calculating a mass concentration of the dust using the first and second currents.

Technical Effects

The dust measuring apparatus according to the present disclosure may calculate the number concentration distribution based on the particle size to derive the mass concentration, which is the regulation standard, thereby achieving the higher accuracy than the conventional dust measuring sensor (e.g., the optical PM sensor). Thus, the accuracy of the controlling of the apparatus including the dust measuring apparatus may be increased, thereby providing the high satisfaction to the user and improving the efficiency of the operation. In addition, in another embodiment of the present disclosure, when the dust measuring apparatus according to the present disclosure is used with the conventional dust measuring sensor (e.g., the optical PM sensor), the accuracy may be further improved.

In addition, the dust measuring apparatus according to the present disclosure may accurately measure the mass concentration by adding only the metal mesh filter and the current measuring unit to the conventional dust filter, thereby accurately measuring the mass concentration. Therefore, the conventional production line may be used intactly. In addition, the mass concentration may be calculated without using the separate particle size classification apparatus, which is advantageous in the miniaturization, so that the dust measuring apparatus according to the present disclosure may be easily mounted in other electronic apparatuses (e.g., the air purifier or the air conditioner) and the high compatibility may be realized. Thus, the product including the dust measuring apparatus may be miniaturized and the expense and unit cost required for the production may be reduced with the high versatility.

DETAILED DESCRIPTIONS

The terms or words used in the specification and claims should not be construed as being limited to the common or dictionary meanings. Further, the inventor should interpret the terms or words as meanings and concepts consistent with the technical idea of the present disclosure, based on the principle that the concept of the terms are able be properly defined in order to best describe the invention thereof. In addition, the embodiment described in the present specification and the components shown in the drawings are only one of the most preferred embodiments of the present disclosure, and do not represent all the technical ideas of the present disclosure. Thus, it should be understood that there may be various equivalents and variations in place of the embodiments and components at the time of the present application.

Hereinafter, an apparatus and a method for measuring dust according to some embodiments of the present disclosure will be described in detail with reference to FIGS. 2 to 8.

Figure 2:
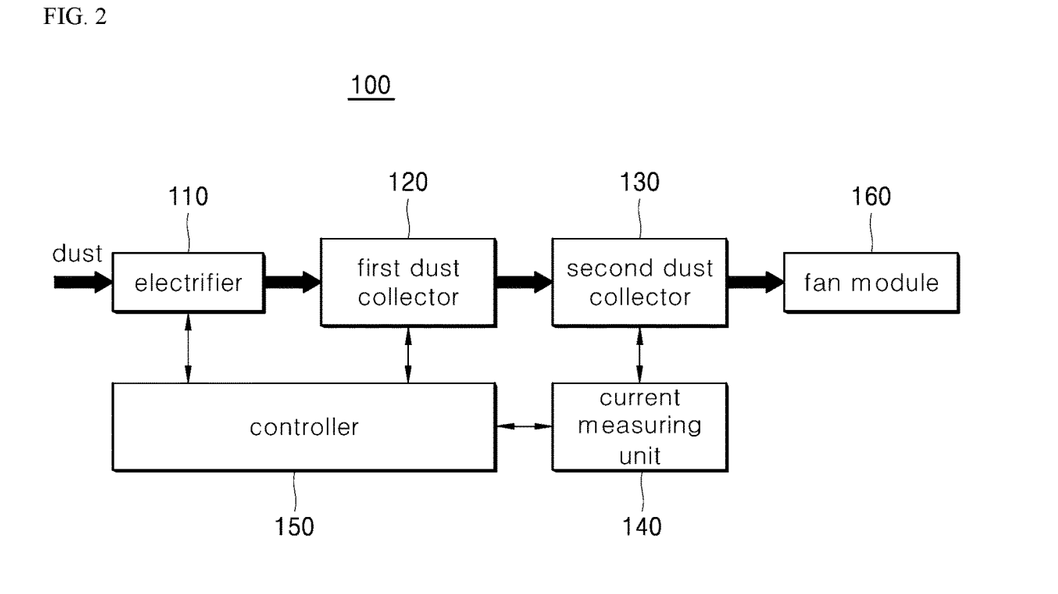
FIG. 2 is a block diagram illustrating a dust measuring apparatus according to some embodiments of the present disclosure.

FIG. 2 is a block diagram illustrating a dust measuring apparatus according to some embodiments of the present disclosure.

Referring to FIG. 2, a dust measuring apparatus 100 according to some embodiments of the present disclosure may include an electrifier 110, a first dust collector 120, a second dust collector 130, a current measuring unit 140, a controller 150, and a fan module 160.

Dust flowed into the dust measuring apparatus 100 may sequentially pass through the electrifier 110, the first dust collector 120, and the second dust collector 130. In this connection, the fan module 160 may move the dust from the electrifier 110 toward the second dust collector 130.

The electrifier 110 may be applied with a first voltage for electrifying (e.g., charging or discharging) the flowed dust. The electrifier 110 may discharge a high voltage to positively or negatively charge dust contained in air passing into the electrifier 110. In this connection, light energy by plasma may be generated inside the electrifier 110.

The dust charged in the electrifier 110 may pass through the first dust collector 120. The first dust collector 120 may include a first dust collecting electrode 122 to which a second voltage is applied and a second dust collecting electrode 124 spaced apart from the first dust collecting electrode 122 and connected to a ground. The first dust collector 120 may collect a portion of the charged dust passing through the first dust collector 120.

The second dust collector 130 may collect the dust passed through the first dust collector 120. The second dust collector 130 may include a filter 135 formed in a mesh shape and made of a metal material. In this connection, the filter 135 may collect the dust passed through the first dust collector 120, and a magnitude of a current flowing through the filter 135 may vary based on an amount of the dust filtered through the filter 135.

The current measuring unit 140 measures the current flowing in the second dust collector 130. In detail, the current measuring unit 140 may measure the magnitude of the current flowing through the filter 135 and transmit the measured magnitude to the controller 150.

For example, the current measuring unit 140 may measure a first current $I_1$ flowing in the second dust collector 130 when the first voltage is applied to the electrifier 110 and the second voltage is not applied to the first dust collector 120. In addition, the current measuring unit 140 may measure a second current $I_2$ flowing in the second dust collector 130 when the first voltage is applied to the electrifier 110 and the second voltage is applied to the first dust collector 120. The current measuring unit 140 may transmit the measured first current $I_1$ and the second current $I_2$ to the controller 150.

The controller 150 may control operations of the electrifier 110, the first dust collector 120, the second dust collector 130, the current measuring unit 140, and the fan module 160. In detail, the controller 150 may adjust whether the voltage is applied to the electrifier 110 and the first dust collector 120, and a magnitude of the applied voltage, and adjust an air volume of the fan module 160. In addition, the measured data from the current measuring unit 140 may be received.

In addition, the controller 150 may calculate mass concentration of the dust flowed into the electrifier 110 using the current value measured by the current measuring unit 140, adjust the voltage applied to the electrifier 110 and the first dust collector 120 based on the mass concentration, and adjust the air volume of the fan module 160.

In detail, the controller 150 may calculate number concentration (or total number concentration of the dust) and an average particle size of the dust flowed into the dust measuring apparatus 100 based on the measured current value. In addition, the controller 150 may calculate number concentration distribution based on a particle size using the calculated number concentration and the average particle size. Subsequently, the controller 150 may calculate the mass concentration using the number concentration distribution based on the particle size. A detailed description thereof will be described later.

Figure 3:
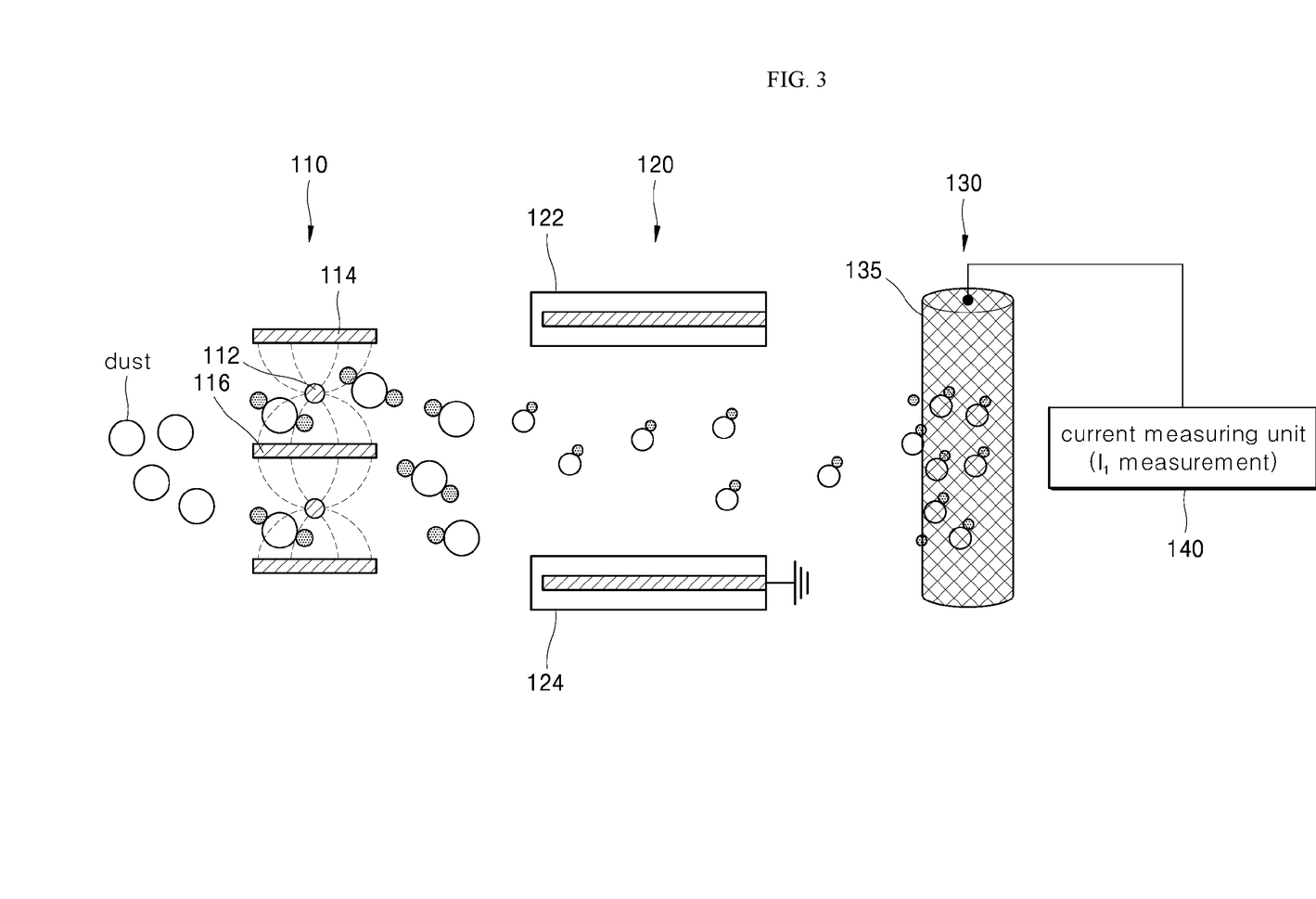
FIGS. 3 and 4 are diagrams for illustrating an operation of a dust measuring apparatus according to some embodiments of the present disclosure.
Figure 4:
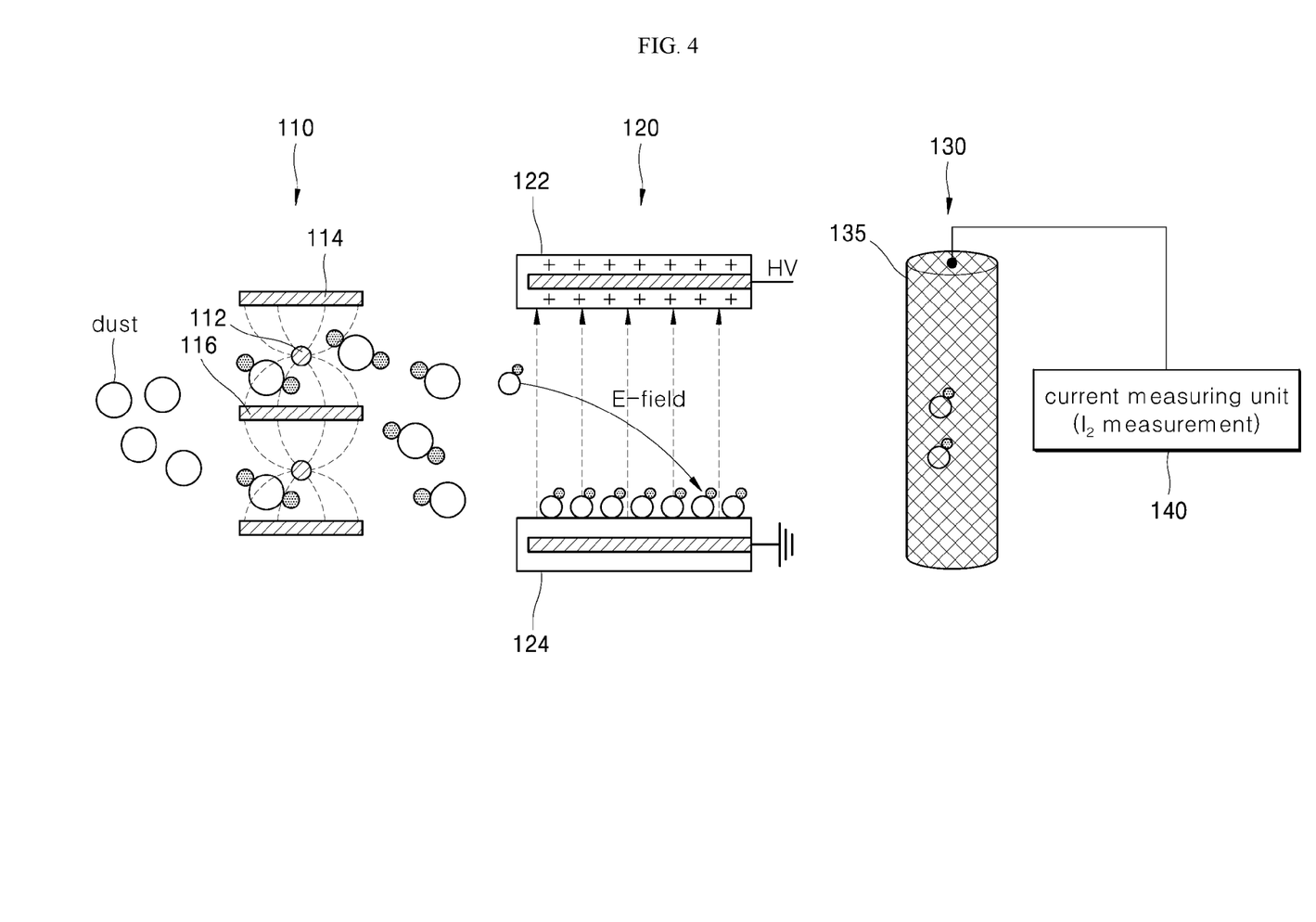

FIGS. 3 and 4 are diagrams for illustrating an operation of a dust measuring apparatus according to some embodiments of the present disclosure.

Referring to FIG. 3, an operation of the dust measuring apparatus 100 when the first voltage is applied to the electrifier 110 and the voltage is not applied to the first dust collector 120 will be described.

When polluted air inflows, the electrifier 110 discharges the high voltage to positively or negatively charge pollutant. The electrifier 110 may include a first electrode 112 to which the high voltage is applied and second electrodes 114 and 116 grounded corresponding to the first electrode 112.

The first electrode 112 may be formed of a wire type, a carbon brush type, or a needle type. The second electrodes 114 and 116 may be disposed above or below the first electrode 112 and may be disposed in a shape of parallel plates facing each other.

For example, referring to FIGS. 1 and 3, when contaminated air in a room is sucked through a suction grill 10 of an air conditioning system and provided to the electrifier 110, the high voltage is continuously applied to the first electrode 112 while the contaminated air passes, thereby forming an electric field toward the second electrodes 114 and 116. In this connection, foreign matter such as dust contained in the air passing through the electrifier 110 is positively or negatively charged by the high voltage electric field.

During the above operation, strong light energy is emitted from the first electrode 112 of the electrifier 110 to generate a plasma phenomenon. The plasma phenomenon means that light energy of 3 to 4 eV is emitted, and the light energy breaks a bond between an organic compound and a heterocyclic compound contained in the contaminated air in the room.

Generally, a contaminant is composed of the organic compound containing carbon C, hydrogen H, and oxygen O and the heterocyclic compound composed of atoms other than carbon C. The heterocyclic compound includes $NO_x$, $SO_x$, and the like. In this connection, a nitrogen oxide $NO_x$, a carbon dioxide $CO_2$, and the like may occur in a process in which a bond of the contaminant is broken while the contaminant passes through a plasma region of the electrifier 110. However, the present disclosure is not limited thereto.

Subsequently, the dust passed through the electrifier 110 may be provided to the first dust collector 120. The first dust collector 120 may include the first dust collecting electrode 122 to which the voltage is applied and the second dust collecting electrode 124 spaced apart from the first dust collecting electrode 122 and connected to the ground. The first dust collector 120 may collect the portion of the charged dust passing through the first dust collector 120.

However, in FIG. 3, since no voltage is applied to the first dust collecting electrode 122, a collecting action of the dust passing through the first dust collector 120 does not occur. The dust passed through the first dust collector 120 is transferred to the second dust collector 130.

The second dust collector 130 includes the filter 135 formed in the mesh shape and made of the metal material. Further, the filter 135 collects the dust flowed into the second dust collector 130.

In this connection, the dust is filtered by the filter 135, and an amount of current flowing through the second dust collector 130 may vary depending on a size and an amount of the dust filtered by the filter 135.

In this connection, the current measuring unit 140 may measure the first current flowing in the second dust collector 130 and transmit the measured first current $I_1$ to the controller 150.

Referring to FIG. 4, an operation of the dust measuring apparatus 100 when the first voltage is applied to the electrifier 110 and the second voltage is applied to the first dust collector 120 will be described.

The electrifier 110 operates in the same manner as described with reference to FIG. 3. A redundant description will be omitted.

Subsequently, the dust passed through the electrifier 110 may be provided to the first dust collector 120.

At this time, the second voltage (e.g., a high voltage of −6 kV to 7 kV) is applied to the first dust collector 120. Accordingly, an electromagnetic field (E-field) may be defined between the first dust collecting electrode 122 and the second dust collecting electrode 124.

For example, a high voltage of a positive electrode may be applied to the first dust collecting electrode 122, and positively charged dust in the electrifier 110 may be repulsed as much as an amount of the positive power applied to the first dust collecting electrode 122, and may be collected to the second dust collecting electrode 124. However, this is merely an example, and the present disclosure is not limited thereto. In addition, although FIG. 4 illustrates that the first dust collecting electrode 122 is disposed at an upper portion and the second dust collecting electrode 124 is disposed at a lower portion, the present disclosure is not limited thereto. Positions of the first dust collecting electrode 122 and the second dust collecting electrode 124 may be changed.

Subsequently, the dust passed through the first dust collector 120 is transferred to the second dust collector 130. That is, a portion of dust is collected by the first dust collector 120 and the remaining portion of dust is transferred to the second dust collector 130.

Similarly, the second dust collector 130 includes the filter 135 formed in the mesh shape and made of the metal material, and the filter 135 the dust flowed into the second dust collector 130.

In this connection, the current measuring unit 140 may measure the second current $I_2$ flowing in the second dust collector 130 and transmit the measured second current $I_2$ to the controller 150.

Figure 5:
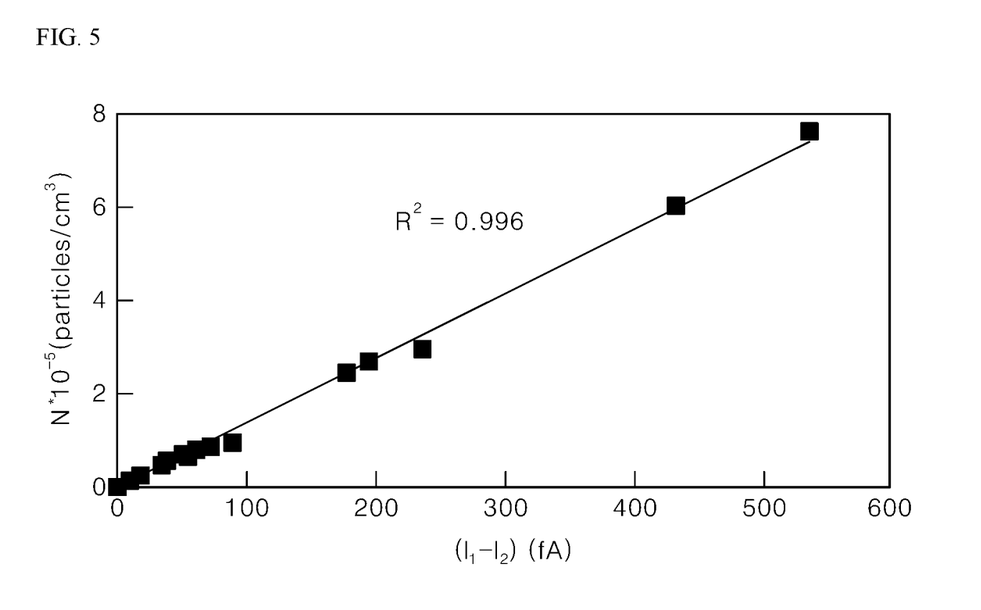
FIG. 5 is a graph illustrating a method for obtaining a number concentration of dust flowed into a dust measuring apparatus of the present disclosure.

FIG. 5 is a graph illustrating a method for obtaining a number concentration of dust flowed into a dust measuring apparatus of the present disclosure.

Referring to FIG. 5, an x axis of FIG. 5 represents a difference between the first current $I_1$ and the second current $I_2$, and a y axis represents the number concentration of the dust.

The controller 150 may use the first current $I_1$ and the second current $I_2$ received from the current measuring unit 140 to calculate the number concentration of the dust (or the total number concentration of the dust) flowed into the dust measuring apparatus 100.

The number concentration (or the total number concentration of the dust) may be calculated using a following Equation 1.

$$N = S_N(I_1 - I_2) \quad \text{[Equation 1]}$$

In the equation, N denotes a number concentration (e.g., a total number concentration of a dust), $I_1$ denotes a first current, $I_2$ denotes a second current, and $S_N$ denotes a number concentration constant. In this connection, the number concentration constant may be a slope of a straight line shown in the graph of FIG. 5.

That is, the number concentration constant may be calculated through the graph of FIG. 5. Further, the controller 150 may calculate the number concentration of the introduced dust (or the total number concentration of the dust) using the first current $I_1$ and the second current $I_2$.

Figure 6:
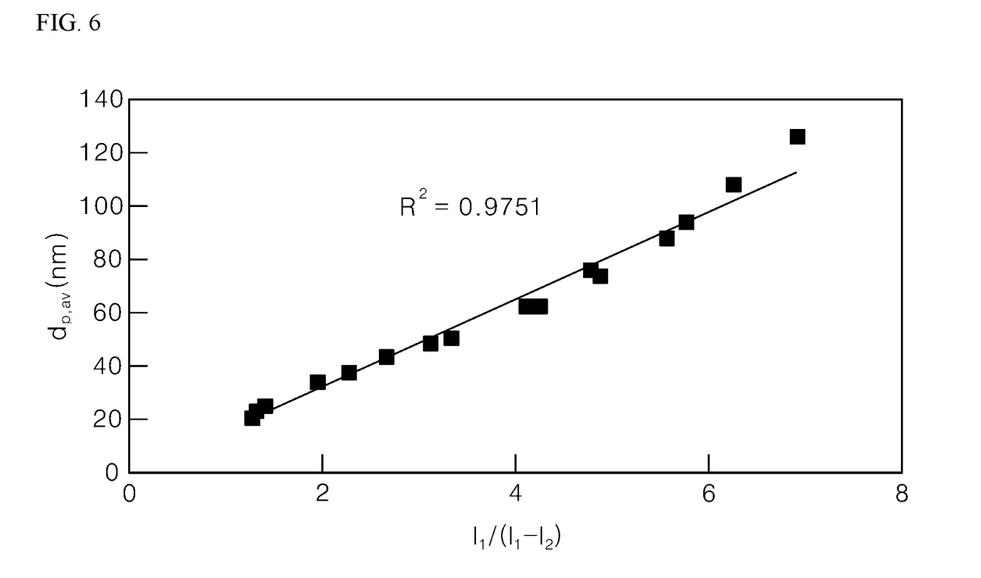
FIG. 6 is a graph illustrating a method for obtaining an average particle size of dust flowed into a dust measuring apparatus of the present disclosure.

FIG. 6 is a graph illustrating a method for obtaining an average particle size of dust flowed into a dust measuring apparatus of the present disclosure.

Referring to FIG. 6, an x axis of FIG. 6 represents a value obtained by dividing the first current $I_1$ by the difference between the first current $I_1$ and the second current $I_2$, and a y axis represents the average particle size of the dust.

The controller 150 may calculate the average particle size of the dust flowed into the dust measuring apparatus 100 using the first current $I_1$ and the second current $I_2$ received from the current measuring unit 140.

The average particle size may be calculated using a following Equation 2.

$$d_{p,av} = S_{dp} \frac{I_1}{I_1 - I_2} \quad \text{[Equation 2]}$$

In the equation, $d_{p,av}$ denotes the average particle size of the dust, $I_1$ denotes the first current, $I_2$ denotes the second current, and $S_{dp}$ denotes an average particle size constant. In this connection, the average particle size constant may be a slope of a straight line shown in the graph of FIG. 6.

That is, the average particle size constant may be calculated through the graph of FIG. 6, and the controller 150 may calculate the average particle size of the introduced dust using the first current $I_1$ and the second current $I_2$.

That is, the average particle size constant may be calculated through the graph of FIG. 6, and the controller 150 may calculate the average particle size of the introduced dust using the first current $I_1$ and the second current $I_2$.

Figure 7:
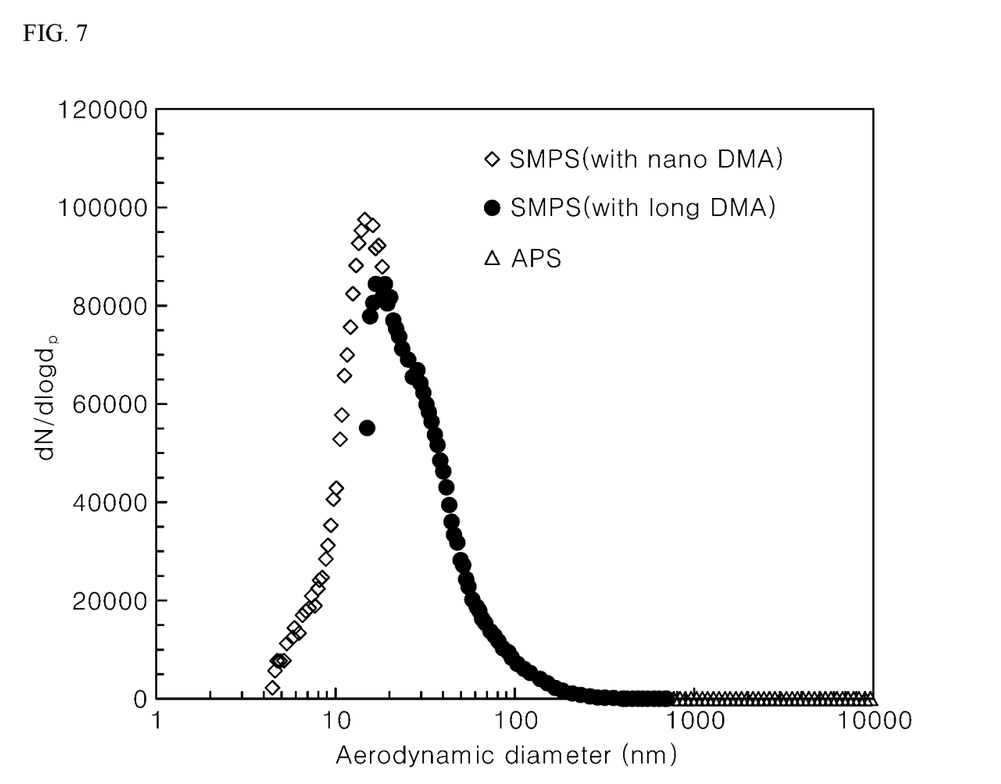
FIG. 7 is a graph illustrating a method for obtaining a number concentration distribution based on a particle size of dust flowed into a dust measuring apparatus of the present disclosure.

FIG. 7 is a graph illustrating a method for obtaining a number concentration distribution based on a particle size of dust flowed into a dust measuring apparatus of the present disclosure.

Referring to FIG. 7, an x axis of FIG. 7 represents a size of the dust (or particle) and a y axis represents the number concentration of the dust. In this connection, FIG. 7 schematically shows a scanning mobility particle sizer (hereinafter, SMPS) value measured for a nano DMA of 4 to 162 nm, a SMPS value for a long DMA of 14.1 to 710.5 nm, and an aerodynamic particle sizer (APS) value measured at a size of 542 to 19000 nm.

The controller 150 may use the number concentration and the average particle size of the dust calculated using the first current $I_1$ and the second current $I_2$ to calculate the 'number concentration distribution based on the particle size' (Lognormal particle size distribution: $N(d_p)$). The 'number concentration distribution based on the particle size' may be expressed as a logarithmic value.

The number concentration distribution based on the particle size may be calculated using a following [Equation 3].

$$dN(d_p) = \frac{N}{\sqrt{2\pi} \ln \sigma} \exp\left[-\frac{(\ln d_p - \ln d_{p,av} + 0.5\ln^2 \sigma)^2}{2(\ln \sigma)^2}\right] d\ln(d_p) \quad \text{[Equation 3]}$$

In the equation, N denotes the number concentration (e.g., the total number concentration of the dust), $d_p$ denotes the particle size of the dust, $d_{p,av}$ denotes the average particle size of the dust, and σ denotes a standard deviation.

In general, a standard deviation of a number concentration distribution based on a particle size of indoor suspended particles may be around 1.7 (in a case of a single-source aerosol). However, the present disclosure is not limited thereto.

Subsequently, the controller 150 may calculate the mass concentration using the number concentration distribution based on the particle size.

The mass concentration may be calculated using a following Equation 4.

mass concentration (μg/cm³)=number concentration (number/cm³)×volume of particles (cm³)×mass density of particles (μg/cm³)    [Equation 4]

In the equation, the volume of the particles may be calculated as a circumferential ratio÷6×particle size³, and the mass density of the particles may be calculated assuming 1 g/cm³ (=1,000 μg/cm³). However, the present disclosure is not limited thereto.

That is, the controller 150 may calculate the number concentration and the average particle size of the dust flowed into the dust measuring apparatus 100 using the first current $I_1$ and the second current $I_2$, calculate the number concentration distribution based on the particle size using the number concentration and the average particle size, and calculate the mass concentration based on the number concentration distribution.

Thus, the dust measuring apparatus 100 of the present disclosure may calculate the number concentration distribution based on the particle size to derive the mass concentration which is a regulation standard, thereby improving the accuracy more than the conventional dust measurement scheme.

In addition, the dust measuring apparatus 100 according to the present disclosure may accurately measure the mass concentration of the introduced dust by adding only the metal mesh filter and the current measuring unit to the existing dust filter. Therefore, there is an advantage of using an existing production line intactly. In addition, the mass concentration may be calculated without using a separate particle size classification apparatus, which is advantageous in miniaturization, so that the dust measuring apparatus 100 according to the present disclosure may be easily mounted in other electronic apparatuses (e.g., an air purifier or an air conditioner) and high compatibility may be realized. Thus, a product including the dust measuring apparatus may be miniaturized and expense and unit cost required for production may be reduced with high versatility.

In an additional embodiment of the present disclosure, the third voltage smaller than the second voltage, which is described with reference to FIG. 4, may be applied to the first dust collecting electrode 122 of the first dust collector 120. In this connection, the third current $I_3$ measured by the current measuring unit 140 may be used for calculation instead of the first current $I_1$. Thus, the controller 150 of the present disclosure may calculate the mass concentration for particles of a size equal to or larger than 300 nm, and may realize a higher accuracy in the mass concentration measurement.

Further, in another additional embodiment, the dust measuring apparatus 100 of the present disclosure may further include a conventional dust measuring sensor. Hereinafter, an optical PM sensor will be described as an example of the conventional dust measuring sensor.

In this connection, the dust measuring apparatus 100 may further perform detecting, by the PM sensor, light scattered on dust passing through the electrifier 110 to calculate a concentration of the dust. Specifically, the PM sensor generates an ascending air current using a heater and scatters light emitted from an LED to dust moving along the ascending air current. Subsequently, the scattered light is detected by the photodiode, and when there is the dust, the output voltage of the photodiode drops. That is, the PM sensor may measure the number concentration of the introduced air by converting the ratio of the low voltage per unit time into the concentration, based on the output voltage value of the photodiode.

Then, when calculating the mass concentration, the controller 150 may calculate the mass concentration by referring to both the value measured by the PM sensor and the first current $I_1$ and the second current $I_2$ measured by the current measuring unit 140.

Thus, the dust measuring apparatus 100 of the present disclosure may further increase the accuracy of the mass concentration calculation, provide high satisfaction to the user, and improve an efficiency of an operation.

Figure 8:
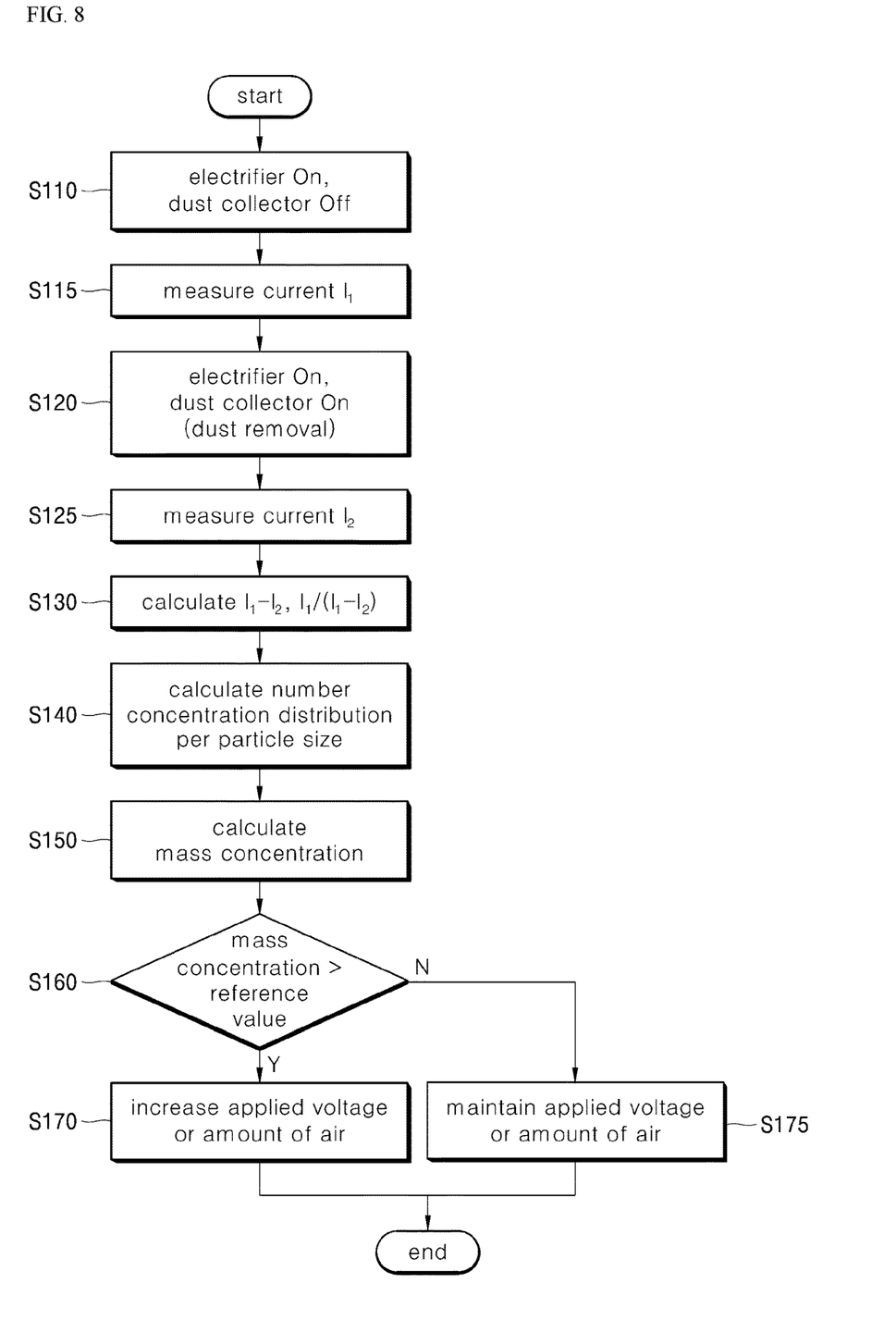
FIG. 8 is a flowchart for illustrating a method for measuring dust according to some embodiments of the present disclosure.

FIG. 8 is a flowchart for illustrating a method for measuring dust according to some embodiments of the present disclosure.

Referring to FIG. 8, in the method for measuring the dust according to some embodiments of the present disclosure, first, the voltage is applied to the electrifier 110 and the voltage is not applied to the first dust collector 120 (S110). In this connection, the dust flowed into the electrifier 110 is charged by the voltage applied to the electrifier 110 and transferred to the first dust collector 120. However, since the voltage is not applied to the first dust collector 120, the dust transferred to the first dust collector 120 is not collected and the dust moves to the second dust collector 130. The dust may be collected by the filter 135 included in the second dust collector 130.

Subsequently, the current measuring unit 140 measures the first current $I_1$ flowing in the second dust collector 130 (S115). The measured value of the first current $I_1$ is transmitted to the controller 150.

Subsequently, the voltage is applied to the electrifier 110 and the voltage is applied to the first dust collector 120 (S120). In this connection, the first voltage is applied to the electrifier 110 and the second voltage is applied to the first dust collector 120. The first voltage and the second voltage may be different from each other. For example, the second voltage may be the high voltage of −6 kV to 7 kV. Thus, the electromagnetic field (E-field) may be defined between the first dust collecting electrode 122 and the second dust collecting electrode 124 included in the first dust collector 120, and the dust flowed into the first dust collector 120 may be collected. The remaining portion of the dust remaining after the portion of the dust is collected by the first dust collector 120 may be collected by the second dust collector 130.

Subsequently, the current measuring unit 140 measures the second current $I_2$ flowing in the second dust collector 130 (S115). The measured value of the second current $I_2$ is transmitted to the controller 150.

Subsequently, the controller 150 calculates the number concentration and the average particle size of the dust using the first current $I_1$ and the second current $I_2$ (S130). In this connection, since the method for calculating the number concentration and the average particle size has been described with reference to FIGS. 5 and 6, a detailed description thereof will be omitted below.

Subsequently, the controller 150 calculates the number concentration distribution based on the particle size using the number concentration and the average particle size of the dust (S140).

Subsequently, the controller 150 calculates the mass concentration using the number concentration distribution based on the particle size (S150). Since the method for calculating the number concentration distribution based on the particle size and the mass concentration has been described with reference to FIG. 7, a detailed description thereof will be omitted below.

Subsequently, the controller 150 determines whether the calculated mass concentration is higher than a predetermined reference value (S160).

Subsequently, when the mass concentration is higher than the predetermined reference value, the controller 150 increases the voltages respectively applied to the electrifier 110 and the first dust collector 120 or increases an air volume of the fan module 160 (S170). Thus, the dust measuring apparatus 100 of the present disclosure may improve a dust collection rate and lower a pollution degree of the discharged air.

That is, the fan module 160 may move the dust from the electrifier 110 toward the second dust collector 130, and the controller 150 may adjust the air volume of the fan module 160 based on the calculated amount concentration.

In addition, the controller 150 may adjust the first voltage applied to the electrifier 110 or the second voltage applied to the first dust collector 120 based on the calculated mass concentration to adjust a dust collection rate in the first dust collector 120.

On the other hand, when the mass concentration is lower than the predetermined reference value, the controller 150 maintains the voltages respectively applied to the electrifier 110 and the first dust collector 120 and the air volume of the fan module 160 (S175).

Additionally, in S110, the third voltage smaller than the second voltage may be applied to the first dust collecting electrode 122 of the first dust collector 120 instead of not applying the voltage thereto. In this connection, the third current $I_3$ measured by the current measuring unit 140 may be used for the calculation instead of the first current $I_1$. Thus, the controller 150 of the present disclosure may calculate the mass concentration for the particles of the size equal to or larger than 300 nm, and may realize the higher accuracy in the mass concentration measurement.

Further, in another additional embodiment, the present disclosure may further include calculating the concentration of the dust using the conventional dust measuring sensor. For example, the PM sensor may be used as the conventional dust measuring sensor.

Subsequently, when calculating the mass concentration, the controller 150 may calculate the mass concentration by referring to both the value measured by the conventional dust measuring sensor and the first current $I_1$ and the second current $I_2$ measured by the current measuring unit 140.

Thus, the dust measuring apparatus 100 of the present disclosure may further increase the accuracy of the mass concentration calculation, provide the high satisfaction to the user, and improve the efficiency of the operation.

Thus, the method for measuring the dust of the present disclosure may calculate the number concentration distribution based on the particle size to derive the mass concentration which is the regulation standard, thereby achieving a higher accuracy than the conventional dust measuring sensor (e.g., the optical PM sensor). Thus, an accuracy of controlling an apparatus including the dust measuring apparatus may be improved, thereby providing the high satisfaction to the user and improving the efficiency of the operation. In addition, in other embodiments of the present disclosure, when the dust measuring apparatus 100 of the present disclosure is used with the conventional dust measuring sensor (e.g., the optical PM sensor), the accuracy may be further improved.

It is to be understood that the aforementioned embodiments are illustrative in all respects and not restrictive. Further, the scope of the present disclosure will be indicated by the following claims rather than the aforementioned description. Further, the meaning and scope of the claims to be described later, as well as all changes and modifications derived from the equivalent concept should be construed as being included in the scope of the present disclosure.

What is claimed is:

1. A dust measuring apparatus comprising:
an electrifier for generating plasma regions to electrify introduced dust;
a first dust collector including first and second dust collecting electrodes arranged to be spaced apart from each other, wherein different voltages are respectively applied to the first and second dust collecting electrodes such that the first and second dust collecting electrodes collect the electrified dust;
a second dust collector for collecting the dust passing through the first dust collector;
a current measuring unit for measuring a current flowing in the second dust collector; and
a controller configured to:
use a current value measured in the current measuring unit to calculate a total number concentration and an average particle size of the dust;
use the calculated total number concentration and average particle size to calculate a number concentration distribution based on a particle size;
calculate a mass concentration of the dust based on the calculated number concentration distribution; and
adjust voltages respectively applied to the electrifier and to the first dust collector based on the mass concentration.

2. The dust measuring apparatus of claim 1, wherein the controller is configured to:
measure a first current flowing in the second dust collector when a voltage is not applied to the first dust collector;
measure a second current flowing in the second dust collector when the voltage is applied to the first dust collector; and
calculate the mass concentration using the first and second currents.

3. The dust measuring apparatus of claim 1, wherein the total number concentration is calculated using a following equation 1, and the average particle size is calculated using a following equation 2:

$$N = S_N(I_1 - I_2) \quad (1)$$

$$d_{p,av} = S_{dp}\frac{I_1}{I_1 - I_2} \quad (2)$$

wherein in the equations 1 and 2, $I_1$ denotes the first current, $I_2$ denotes the second current, N denotes the total number concentration of the dust, $S_N$ denotes a number concentration constant, $d_{p,av}$ denotes the average particle size of the dust, and $Sa_p$ denotes an average particle size constant.

4. The dust measuring apparatus of claim 1, wherein the controller is configured to increase the voltages respectively applied to the electrifier and to the first dust collector when the mass concentration is higher than a predetermined reference value.

5. The dust measuring apparatus of claim 1, further comprising:
a fan module for moving the dust from the electrifier toward the second dust collector,
wherein the controller is configured to control an operation of the fan module based on the mass concentration.

6. The dust measuring apparatus of claim 5, wherein the controller is configured to increase an amount of air generated in the fan module when the mass concentration is higher than a predetermined reference value.

7. The dust measuring apparatus of claim 1, wherein the second dust collector includes a filter formed in a mesh shape and made of a metal material,
wherein the filter is electrically connected to the current measuring unit, and
wherein the current measuring unit measures a current flowing through the filter.

8. The dust measuring apparatus of claim 1, wherein the electrifier includes a first electrode and a second electrode,
wherein a voltage is applied to the first electrode,
wherein the second electrode includes first and second portions respectively disposed above and below the first electrode, and
wherein the plasma regions are respectively defined between the first electrode and the first and second portions of the second electrode.

9. A method for measuring dust of a dust measuring apparatus including an electrifier for electrifying introduced dust, a first dust collector for collecting the electrified dust, and a second dust collector for collecting the dust passing through the first dust collector, the method comprising:
generating plasma regions in the electrifier to electrify introduced dust;
measuring a first current flowing in the second dust collector when a first voltage is applied to the electrifier and a second voltage is not applied to the first dust collector;

measuring a second current flowing in the second dust collector when the first voltage is applied to the electrifier and the second voltage is applied to the first dust collector; and using the first current and the second current to calculate a total number concentration and an average particle size of the dust, using the calculated total number concentration and average particle size to calculate a number concentration distribution based on a particle size, and calculating a mass concentration of the dust based on the calculated number concentration distribution.

10. The method of claim 9, further comprising:

adjusting voltages respectively applied to the electrifier and to the first dust collector based on the mass concentration.

11. The method of claim 10, wherein the adjusting of the voltages respectively applied to the electrifier and to the first dust collector includes:

increasing the voltages respectively applied to the electrifier and to the first dust collector when the mass concentration is higher than a predetermined reference value.

12. The method of claim 9, wherein the measuring of the first current includes:

applying a third voltage to the first dust collector, wherein the third voltage is smaller than the second voltage.

13. The method of claim 9, wherein the total number concentration is calculated using a following equation 1, and the average particle size is calculated using a following equation 2:

$$N = S_N(I_1 - I_2) \quad (1)$$

$$d_{p,av} = S_{dp}\frac{I_1}{I_1 - I_2} \quad (2)$$

wherein in the equations 1 and 2, $I_1$ denotes the first current, $I_2$ denotes the second current, N denotes the total number concentration of the dust, $S_N$ denotes a number concentration constant, $d_{p,av}$ denotes the average particle size of the dust, and $S_{dp}$ denotes an average particle size constant.

14. The method of claim 9, further comprising:

moving the dust from the electrifier toward the second dust collector using a fan module; and controlling an operation of the fan module based on the mass concentration.

15. The method of claim 14, wherein the controlling of the operation of the fan module based on the mass concentration includes:

increasing an amount of air generated in the fan module when the mass concentration is higher than a predetermined reference value.

16. The method of claim 9, wherein the second dust collector includes a filter formed in a mesh shape and made of a metal material, and wherein the first and second currents are measured by a current measuring unit measuring a current flowing in the filter.

17. The method of claim 9, wherein the electrifier includes a first electrode and a second electrode, wherein the first voltage is applied to the first electrode, wherein the second electrode includes first and second portions respectively disposed above and below the first electrode portion, and wherein the plasma regions are respectively defined between the first electrode and the first and second portions of the second electrode.

18. The method of claim 9, further comprising:

detecting light scattered on the dust by a particulate matter (PM) sensor to calculate a concentration of the dust, wherein the calculating of the mass concentration includes:

calculating the mass concentration using a value measured by the PM sensor and the first and second currents.

* * * * *